US008422416B2

(12) United States Patent
Park et al.

(10) Patent No.: US 8,422,416 B2
(45) Date of Patent: Apr. 16, 2013

(54) UPDATING METHOD AND APPARATUS OF SLEEP MODE OPERATION

(75) Inventors: Giwon Park, Gyeonggi-Do (KR); Yongho Kim, Gyeonggi-Do (KR); Kiseon Ryu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 12/833,734

(22) Filed: Jul. 9, 2010

(65) Prior Publication Data

US 2011/0007681 A1     Jan. 13, 2011

Related U.S. Application Data

(60) Provisional application No. 61/224,910, filed on Jul. 12, 2009.

(30) Foreign Application Priority Data

Nov. 11, 2009  (KR) .......................... 10-2009-0108787

(51) Int. Cl.
*G08C 17/00* (2006.01)

(52) U.S. Cl.
USPC ............................ 370/311; 370/318; 370/342

(58) Field of Classification Search .................. 370/318, 370/311, 328–228, 342, 542–545, 312, 256, 370/349–359, 412–428, 235, 450–457
See application file for complete search history.

(56) References Cited

U.S. PATENT DOCUMENTS

| 2006/0014534 | A1 | 1/2006 | Costa-Requena et al. |
| 2006/0039320 | A1 | 2/2006 | Kang et al. |
| 2010/0002612 | A1* | 1/2010 | Hsu et al. ...................... 370/311 |
| 2010/0002615 | A1* | 1/2010 | Gupta .......................... 370/311 |

FOREIGN PATENT DOCUMENTS

| KR | 10-2006-0029905 A | 4/2006 |
| KR | 10-2008-0049958 A | 6/2008 |
| KR | WO2008094017 A2 * | 8/2008 |

* cited by examiner

*Primary Examiner* — Ricky Ngo
*Assistant Examiner* — Iqbal Zaidi
(74) *Attorney, Agent, or Firm* — Birch, Stewart, Kolasch & Birch, LLP

(57) ABSTRACT

Disclosed herein relates to a sleep mode operation method, and the method of updating a sleep mode operation according to the present invention may include receiving a service flow configuration request (DSx-REQ) message comprising a service flow parameter for service flow configuration and a sleep cycle ID (SCID) for sleep mode change according to the service flow configuration from a base station during a sleep mode listening window; transmitting a service flow configuration response (DSx-RSP) message comprising the SCID; and configuring the service flow according to the service flow identifier, and changing a SCID to the SCID to update the sleep mode operation.

8 Claims, 11 Drawing Sheets

Fig. 2 SCID switching through an additional signaling procedure

Fig. 4 SCID switching through DSx-REQ/RSP – terminal request added

UPDATING METHOD AND APPARATUS OF SLEEP MODE OPERATION

RELATED APPLICATION

Pursuant to 35 U.S.C. §119(a), this application claims the benefit of U.S. Provisional Application No. 61/224,910, filed on Jul. 12, 2009 and Korean Application No. 10-2009-0108787, filed on Nov. 11, 2009, the contents of which is incorporated by reference herein in its entirety.

BACKGROUND OF THE INVENTION

1. Field of the Invention

The present invention relates to a sleep mode operation method and apparatus, and more particularly, to a method and apparatus for updating a sleep cycle ID (SCID).

2. Description of the Related Art

The problem of power consumption in terminals may be a considerably important element in a broadband wireless mobile communication system compared to other systems because the mobility of terminals should be considered. A sleep mode operation between a terminal and a base station has been proposed as one of such methods for minimizing power consumption in the terminal.

In a conventional sleep mode operation, a terminal requests to enter into a sleep mode if there exists no more traffic to be transmitted and/or received to and/or from a base station while performing a communication with the base station in an active mode, and receives a response to that request from the base station to change the state thereof to a sleep mode.

The terminal that has entered into a sleep state receives a message indicating whether there exists a traffic transferred from the base station during a sleep listening window, and determines that there exists no data traffic transmitted to a downlink, and increases the current sleep cycle twice if negative indication indicating that there exists no traffic is received.

Furthermore, if positive indication is received from the base station during the listening window, then the terminal determines that there exists data traffic transferred to a downlink, and initializes the current sleep cycle.

On the other hand, if the terminal is entered into a sleep mode operation and then a new service is added or a service change or service deletion is generated, then the sleep mode operation should be changed according to that.

In this case, according to the related art, if connection configuration through service flow generation is completed, then a procedure of updating a sleep cycle ID (SCID) for performing a sleep mode operation change should be additionally carried out, thereby causing a problem of signaling overhead in which a new sleep mode request and response message should be transmitted or received between the terminal and the base station.

SUMMARY OF THE INVENTION

An object of the present invention is to provide a method and apparatus capable of updating a sleep mode operation through a message for changing service flow in case where the service of a terminal being operated in a sleep mode is changed.

In addition, another object of the present invention is to provide a method of updating a sleep cycle ID for updating a sleep mode operation, and a method of updating the sleep mode operation in a terminal using the same.

In order to accomplish the foregoing object, a method of updating a sleep mode operation in a terminal according to an embodiment of the present invention may include receiving a service flow configuration request (DSx-REQ) message comprising a service flow parameter for service flow configuration and a sleep cycle ID (SCID) for sleep mode change according to the service flow configuration from a base station during a sleep mode listening window; transmitting a service flow configuration response (DSx-RSP) message comprising the SCID; and configuring the service flow according to the service flow identifier, and changing a SCID to the SCID to update the sleep mode operation.

In order to accomplish the foregoing object, a method of updating a sleep mode operation in a terminal according to another embodiment of the present invention may include receiving a service flow configuration request (DSx-REQ) message comprising a service flow identifier for service flow configuration from a base station during a sleep mode listening window; transmitting a service flow configuration response (DSx-RSP) message comprising the sleep cycle ID; receiving a service flow configuration confirmation (DSx-ACK) message comprising a sleep cycle ID for sleep mode update according to the service flow configuration from the base station; and configuring the service flow according to the service flow identifier, and changing a previously-assigned sleep cycle ID to the sleep cycle ID to update the sleep mode operation.

In order to accomplish the foregoing object, a method of updating a sleep mode operation in a terminal according to still another embodiment of the present invention may include transmitting a sleep mode request message for entering into the sleep mode to a base station; receiving a sleep mode response message comprising a sleep mode operation parameter from the base station; changing the state to the sleep mode by referring to the sleep mode operation parameter; receiving sleep mode update information comprising a sleep cycle ID and a sleep mode update operation start frame information from the base station; and updating the sleep mode operation by referring to the sleep mode update information, wherein a sleep cycle is updated at the time of the sleep mode update operation start frame information if the sleep mode update operation start frame is a previous frame that has received the sleep mode update information.

In order to accomplish the foregoing object, a method of updating a sleep mode operation in a terminal according to yet another embodiment of the present invention may include transmitting a sleep mode request message for entering into the sleep mode to a base station; receiving a sleep mode response message comprising a sleep mode operation parameter from the base station; changing the state to the sleep mode by referring to the sleep mode operation parameter; reporting the characteristic of a service flow being executed to the base station if the characteristic of a service flow being executed has been changed; receiving sleep mode update information including a sleep cycle ID through an unsolicited sleep mode response message or sleep control extended header from the base station; and updating the sleep mode operation by referring to the sleep mode update information.

In order to accomplish the foregoing object, a sleep operation apparatus according to an embodiment of the present invention may include a receiver configured to receive a service flow configuration request message comprising a service flow connection related to service addition, change or deletion during a sleep mode listening window and the service flow operation parameter; a transmitter configured to transmit a service flow configuration response message to the service flow configuration request message; and a controller configured to perform the service flow connection and operation parameter configuration, and update the sleep cycle of the sleep mode and the sleep mode operation for the service flow operation, wherein the controller updates the sleep cycle of the sleep mode when configuring a service flow connection related to the service addition, change or deletion.

According to the present invention, in the sleep mode operation of a terminal, updating of sleep cycle information is carried out through a message for service flow change even in case where the service of a terminal being operated in a sleep mode is changed, thereby solving a conventional problem of generating a signaling overhead.

Furthermore, even in case where a message for updating a sleep mode operation is received subsequent to a normal update operation timing through data retransmission such as HARQ due to a bad channel situation, it may be possible to update a sleep mode operation through a sleep mode update operation method provided by the present invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
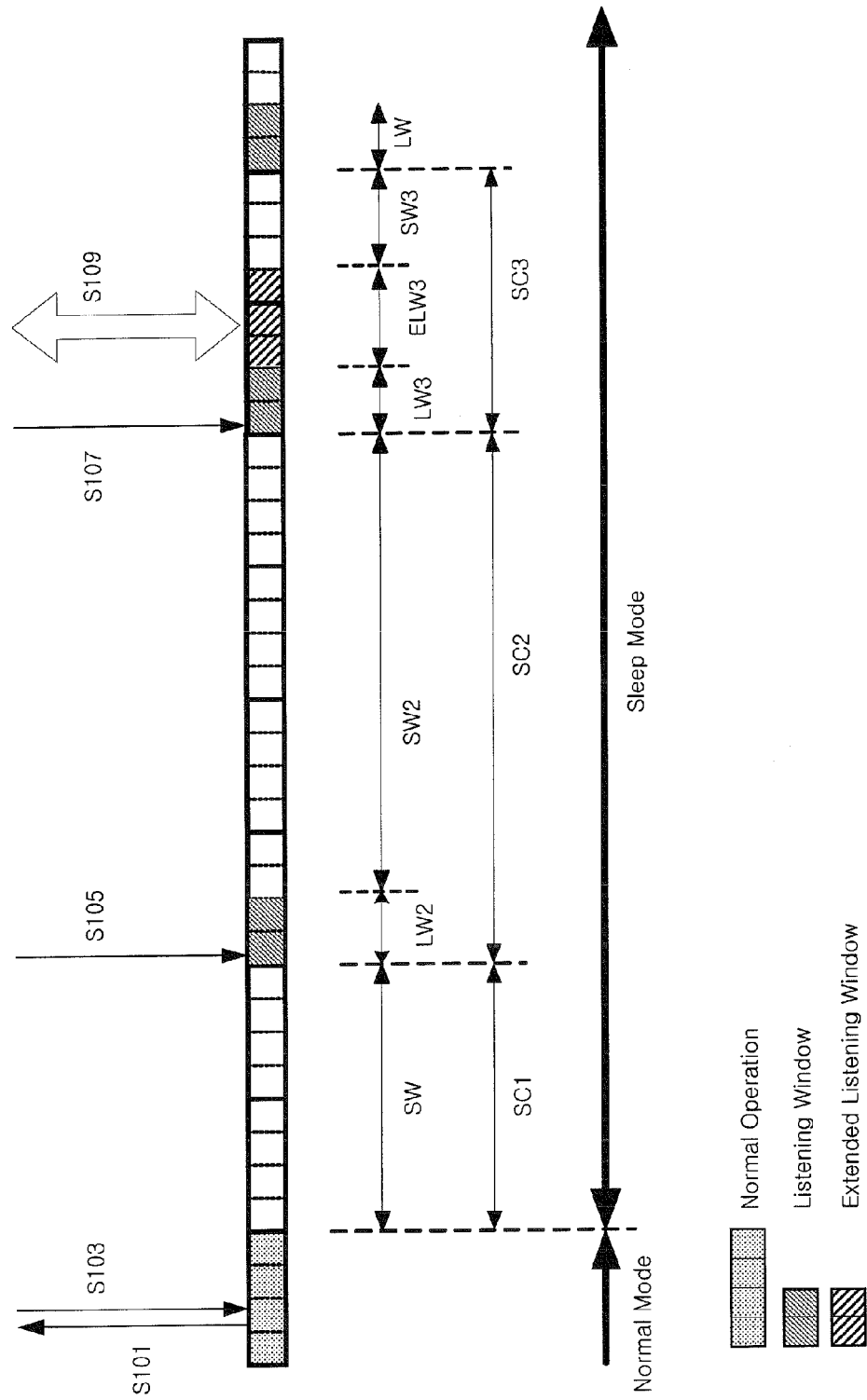
FIG. 1 is a view illustrating a typical sleep mode operation.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, the term "terminal" herein is used with a meaning, commonly referred to as a user equipment (UE), a mobile equipment (ME), and a mobile station (MS). Furthermore, the terminal may be portable equipment such as a portable phone, a PDA, a smart phone, and a notebook, or non-portable equipment such as a PC, and a vehicle-loaded device.

FIG. 1 is a view illustrating a typical sleep mode operation.

A terminal transmits a SLP-REQ message for requesting to switch to a sleep mode to the base station if there exists no more traffic to be transmitted or received in a normal state (S101), and receives a SLP-RSP message including a sleep parameter such as sleep cycle, listening window, and the like from the base station (S103) and the state thereof is switched to a sleep mode.

The sleep mode may include a sleep window (SW) incapable of receiving data and a listening window (LW) capable of receiving data.

The terminal increases power to be changed to a state capable of transmitting or receiving data traffic in the listening window (LW), and the terminal decreases power to enter into a power saving mode in the sleep window (SW).

The terminal applies operate a sleep mode by applying a sleep cycle (SC1) including only a sleep window (SW1) when changing the state to an initial sleep mode. From a second sleep cycle subsequent to terminating the first sleep cycle (SC1), the terminal operates the sleep mode by applying a sleep cycle (SC2) including a listening window (LW2) and a sleep window (SW2).

In the second sleep cycle (SC2), if a TRF-IND message including negative indication is received from the base station during the listening window (LW2) (S105), then the terminal determines that there exists no traffic transmitted to a downlink, thereby increasing the current sleep cycle twice.

Subsequent to terminating the sleep cycle (SC2) increased twice, if a TRF-IND message including positive indication is received during a listening window (LW3) of the following sleep cycle (SC3) (S107), then the terminal extends the listening window (ELW3) to receive the generated data traffic and then receives data traffic from the base station (S109), and enters into a sleep window (SW3) again to perform a sleep mode operation. At this time, the sleep cycle (SC3) includes a listening window (SW3), an extended listening window (LW3), and a sleep window (SW3) as illustrated in the drawing, and then the sleep cycle (SC3) is reset to an initial sleep cycle (SC1).

As illustrated in FIG. 1, if a new service is added, or service change or service deletion is generated, then a sleep cycle ID and sleep mode operation according to that should be updated.

Hereinafter, a method of updating a sleep cycle ID (hereinafter, referred to as "SCID") for sleep mode operation update will be described. Messages for adding a new service, changing or deleting a service in a terminal are defined as a dynamic service add (DSA) message, a dynamic service change (DSC) message, or dynamic service delete (DSD) message, respectively, and hereinafter those three messages are commonly referred to as a service flow configuration message (DSx message).

Furthermore, hereinafter, for the sake of convenience of explanation, a dynamic service add message among those three messages will be described as an representative example, and in case of the service change and service deletion, the SCID update method will be applied thereto similarly as in the service addition.

Figure 2:
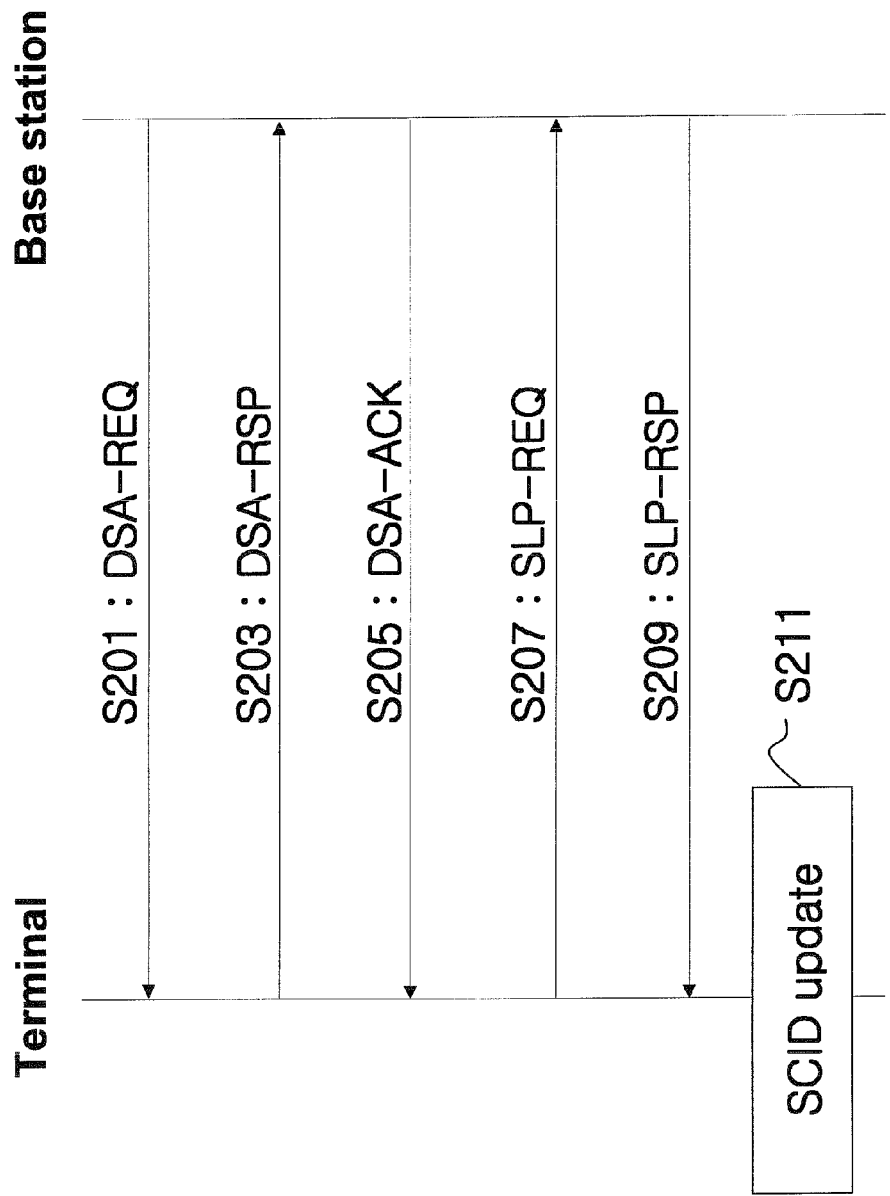
FIG. 2 is a configuration diagram illustrating a sleep mode operation update process in case where a new service is added to a terminal being operated in a sleep mode.

FIG. 2 is a flow chart illustrating a sleep mode operation update process in case where a new service is added to a terminal being operated in a sleep mode. A service flow configuration message (DSx message) may be initiated by a terminal as well as by a base station, and hereafter it will be described a case where it is initiated by a base station as an example, for the sake of convenience of explanation.

In case where a base station is to add a new service to a terminal currently being operated in a sleep mode state, the base station transmits a dynamic service add message (DSA-REQ) (S201). The dynamic service add message (DSA-REQ) may be transmitted to the base station by a request of the terminal, but a case of requesting from the base station is illustrated as a representative embodiment in FIG. 2, for the sake of convenience of explanation.

The connection configuration and service flow parameter for a new service flow are defined in the DSA-REQ message.

The terminal receives a DSA-REQ message from the base station to perform parameter configuration for a new service flow, and then transmits a response message (DSA-RSP) to the dynamic service add message to the base station (S203).

The base station receives a dynamic service add response message from the terminal, and then transmits a confirmation message (DSA-ACK) to the terminal (S205).

Through the foregoing process, connection configuration through new service flow generation is carried out.

Subsequently, the terminal transmits a sleep mode request message (SLP-REQ) for updating SCID in which a newly added service flow is reflected to the base station (S207).

The base station transmits a response message (SLP-RSP) including SCID update information for sleep mode update to the terminal (S209).

The terminal receives the SLP-RSP message from the base station to update SCID, and then operates in an updated sleep mode (S211).

The sleep mode update operation in FIG. 2 additionally requires a signaling process for SCID update request and response to update a sleep mode operation in which the relevant service flow is reflected after performing connection configuration for a new service flow, thereby causing a problem of generating a signaling overhead as illustrated in the above.

Figure 3:
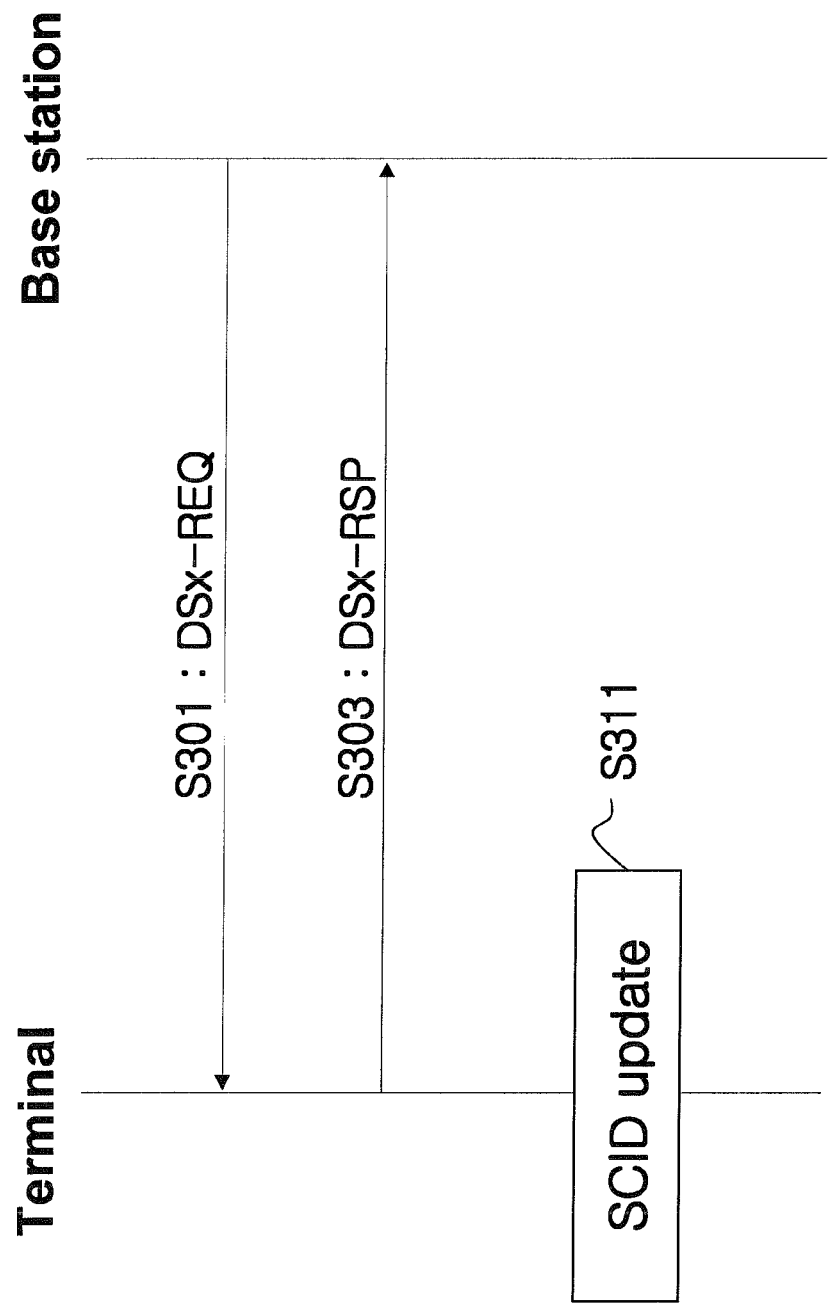
FIG. 3 is a configuration diagram sequentially illustrating a sleep mode operation update process according to an embodiment of the present invention.

FIG. 3 is a configuration diagram sequentially illustrating a sleep mode operation update process according to an embodiment of the present invention.

The base station transmits a service flow configuration request message (DSx-REQ) to the terminal to add a new service, or change or delete a current service (S301).

The service flow configuration request message is a DSA-REQ or DSC-REQ message if it is a service flow add or change request to add a new service flow or change a current service flow, and a service flow parameter including the traffic characteristic and scheduling requirement of the added or changed service flow is included in the service flow configuration request message.

At this time, a dynamic service change request message (DSx-REQ) for changing a parameter of the service flow may include SCID update information for updating a sleep mode operation according to service flow addition or change.

In case where the service flow configuration request message is a request for deleting a current service flow, it corresponds to a DSD-REQ message, and the DSD-REQ message may include a service flow subject to the deletion.

Accordingly, a previously assigned SCID may be updated through the DSx-REQ message together with a request for adding, changing or deleting a service flow.

In other words, it is transferred through a DSx-REQ message including SCID and a start frame number without an additional signaling procedure for updating the SCID, and thus it may be possible to update sleep mode operation information through a more simplified signaling procedure.

A DSx-REQ message including SCID update and updated sleep mode start information is illustrated in the following Table 1.

TABLE 1

| Name | Value | Usage |
| --- | --- | --- |
| Operation | 0b00: To switch Sleep Cycle setting in DSx-REQ message which has been negotiated since the MS entered Sleep Mode 0b01-0b11: reserved | This indicates operation request type of DSx-REQ message |
| SCID | 0~15 | Sleep Cycle ID |
| Start Frame Number | 0~63 | Least Significant 6 bits of Frame Number. This field appears when Operation is 0b00. |

Referring to Table 1, in case where an operation parameter of the DSA-REQ message is set to "0b00", the current SCID is switched to a newly assigned SCID through the DSx-REQ message.

A SCID parameter in the DSx-REQ message corresponds to a SCID update parameter which is to be switched with a previously-assigned SCID. In addition, a start frame number parameter indicates updated sleep mode cycle start frame information.

The terminal that has received a service flow configuration request message (DSx-REQ) configures a service flow connection and operation parameter, and transfers a service flow configuration response message (DSx-RSP) to the base station (S303).

A DSx-RSP message including SCID update and updated sleep mode start information is illustrated in the following Table 2.

TABLE 2

| Name | Value | Usage |
| --- | --- | --- |
| Response Code | 0b00: DSx-RSP message is transmitted to approve the switch of a Sleep Cycle setting which has been negotiated since the MS entered Sleep Mode 0b01: DSx-RSP message is transmitted to reject the request sent by MS 0b10~0b11: Reserved | This indicates response type of DSx-RSP message. |
| SCID | 0~15 | Sleep Cycle ID This field appears when Response Code is 0b00 or 0b01 |
| Start Frame Number | 0~63 | Least Significant 6 bits of Frame Number. This field appears when Response Code is 0b00. |

Referring to Table 2, it is indicated in the DSx-REQ message that a SCID switching request is approved in case where a response code parameter of the DSx-RSP message is set to "0b00", but indicated that the SCID switching request is rejected in case where the response code parameter is set to "0b01".

A SCID parameter of the DSx-RSP message corresponds to a SCID update parameter which is to be switched with a previously assigned SCID. In addition, a start frame number parameter indicates updated sleep mode cycle start frame information.

As described above, in case where SCID is updated through DSx-REQ and DSx-RSP messages in Tables 1 and 2, the SCID to be switched with the previous SCID and the start frame number indicating a frame number for applying the relevant SCID may be included in the relevant message.

Subsequently, the terminal switches the previously assigned SCID to a newly assigned SCID to update a sleep mode operation (S311).

According to another embodiment of the present invention, only SCID may be included in a DSx-REQ/RSP message without information for a "start frame number" indicating a start frame to which a new sleep cycle is applied, and at this time the terminal resets the sleep cycle to an initial sleep cycle at the moment when receiving DSx-REQ/RSP message including SCID to be updated, thereby operating the updated sleep mode.

Figure 4:
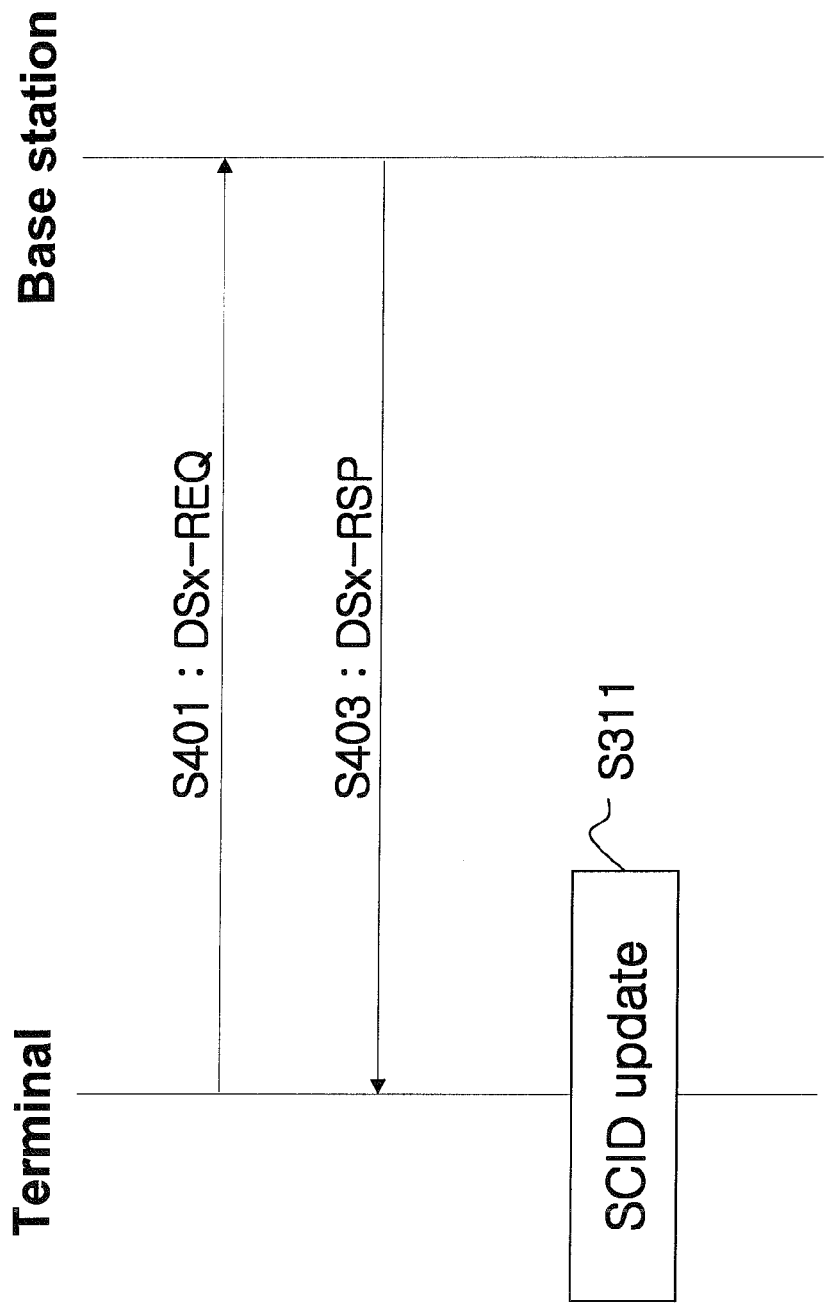
FIG. 4 is a configuration diagram sequentially illustrating a sleep mode operation update process according to another embodiment of the present invention.

FIG. 4 is a configuration diagram sequentially illustrating a sleep mode operation update process according to another embodiment of the present invention, which corresponds to a case where the terminal requests new service addition, service change or service deletion to the base station.

The terminal transmits a service flow configuration request message (DSx-REQ) to the base station to add a new service, or change or delete a service (S401).

The service flow configuration request message is a DSA-REQ or DSC-REQ message in case where it is a service flow addition or change request for adding a new service flow or changing a current service flow, and a service flow parameter including the traffic characteristic or scheduling requirement of the added or changed service flow is included in the service flow configuration request message.

At this time, a dynamic service change request message (DXs-REQ) for changing a parameter of the service flow may include SCID update information for updating a sleep mode operation according to the service flow addition or change.

The service flow configuration request message is a DSD-REQ message in case where it is a request for deleting a current service flow, and the DSD-REQ message may include a service flow information subject to deletion.

Accordingly, the previously assigned SCID can be updated together with a request for adding changing and deleting a service flow through the DSx-REQ message.

The base station that has received a service flow configuration request message (DSx-REQ) from the terminal transfers a service flow configuration response message (DSx-RSP) including a SCID update parameter to the terminal (S403).

Subsequently, the terminal switches the previously assigned SCID to a newly assigned SCID to update a sleep mode operation (S311).

Figure 5:
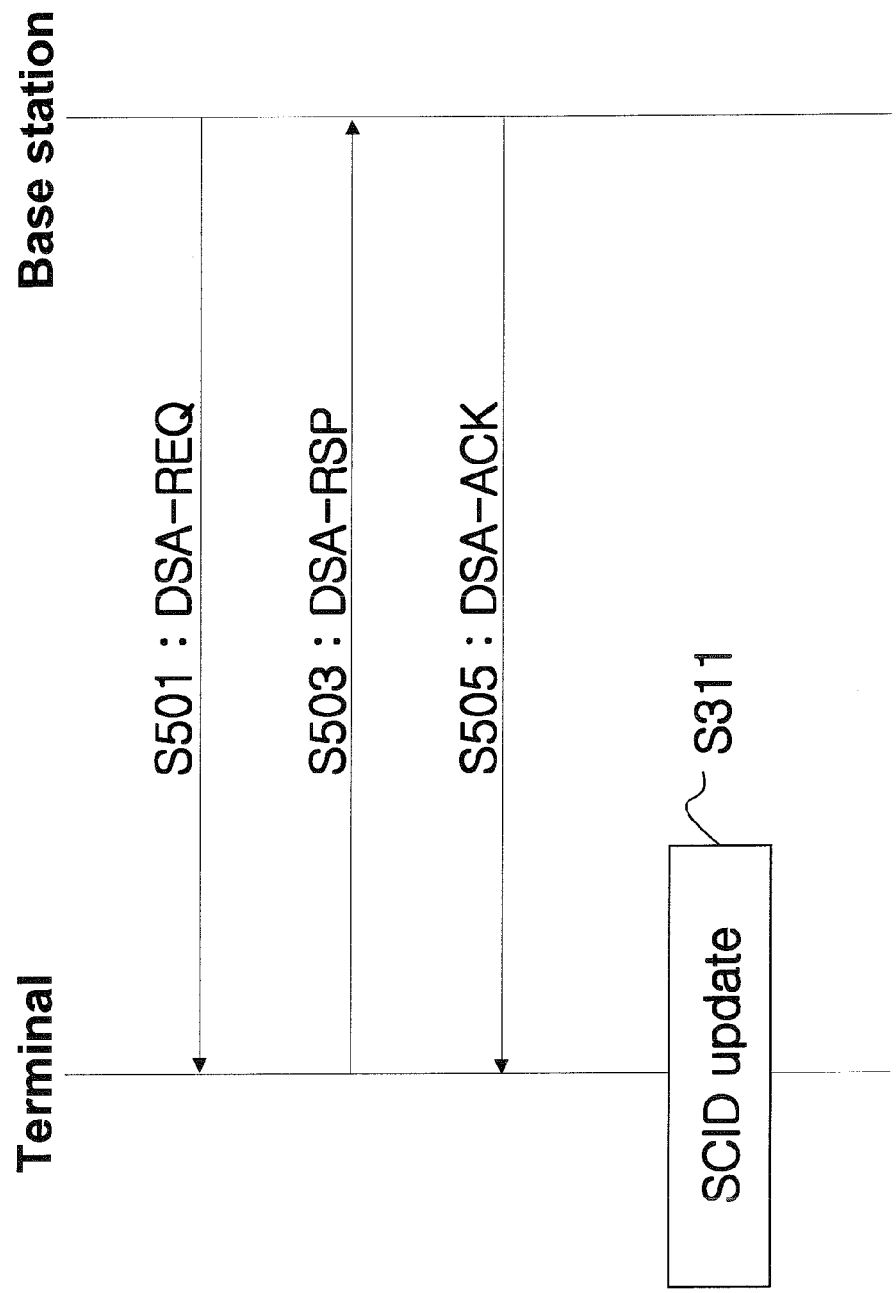
FIG. 5 is a configuration diagram sequentially illustrating a sleep mode operation update process according to still another embodiment of the present invention.

FIG. 5 is a configuration diagram sequentially illustrating a sleep mode operation update process according to still another embodiment of the present invention.

The base station transmits a dynamic service add request message (DSA-REQ) defining connection configuration for a new service flow and service flow parameter to the terminal (S501). The dynamic service add request message (DSA-REQ) may be transmitted to the base station by a request of the terminal, but it is illustrated a case of requesting from the base station as a representative embodiment in FIG. 5, for the sake of convenience of explanation.

The terminal that has received a dynamic service add request message performs parameter configuration for a new service flow, and transmits a dynamic service add response message (DSA-RSP) to the base station (S503).

The base station that has received a dynamic service add response message (DSA-RSP) transmits a dynamic service add confirmation message (DSA-ACK) to the terminal (S505). At this time, a SCID update parameter may be included in a downlink (DL) sleep control extended header as illustrated in the following Table 3.

TABLE 3

| Syntax | Size (bit) | Notes |
|---|---|---|
| Last | 1 | Last Extended Header indication:<br>0 = one or more extended header follows the current extended header unless specified otherwise;<br>1 = this extended header is the last extended header unless specified otherwise |
| Type | TBD | Type of Extended header |
| Operation | 2 | 0b00: Exit Sleep Mode<br>0b01: Change Sleep Mode<br>0b10: Extension of Listening Widow<br>0b11: Termination of Listening Window |
| if(Operation == 0b01){ | | |
| Sleep_Cycle_ID (SCID) | 4 | |
| Start Frame Number | 4 | This parameter indicates start frame number that the sleep cycle changes to the new sleep cycle settings. |
| } | | |
| Reserved | variable | Reserved bits are added at the end of DL Sleep Control Extended Header for byte alignment |

In Table 3, the "operation" parameter is related to a sleep mode operation, which indicates the completion and change of a sleep mode operation, and listening window extension and completion.

For the SCID update according to the service addition of a terminal, the base station sets the operation parameter in the DL sleep control extended header to "0b01", thereby transmitting to the terminal.

At this time, the start frame information of a sleep mode operation to be updated indicates a start frame to which a new sleep cycle is applied through a "start frame number" parameter The terminal that has received SCID update information through the DL sleep control extended header defined in Table 1 activates an update operation in the relevant frame by referring to start frame information related to the timing for activating the relevant SCID update (start frame number) (S311).

Referring to an embodiment as illustrated in FIG. 5, an additional procedure for transmitting or receiving a message for transmission connection assigned in a new service flow generation process is omitted compared to an embedment of FIG. 2 while defining SCID, thereby reducing an overall signaling overhead.

Figure 6:
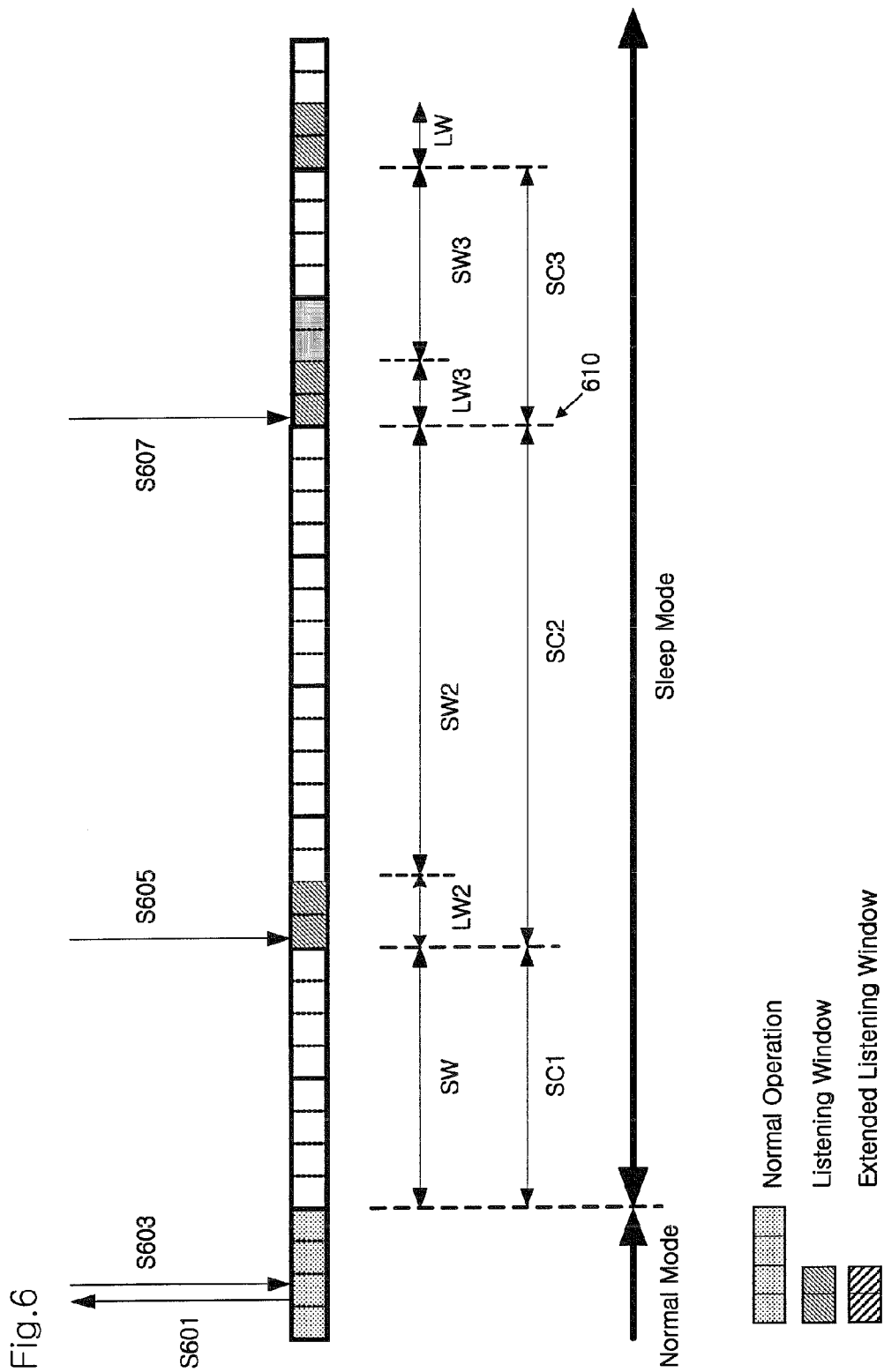
FIG. 6 is a view sequentially illustrating a sleep mode operation according to an embodiment of the present invention.

FIG. 6 is a view sequentially illustrating a sleep mode operation according to an embodiment of the present invention.

The terminal performs communication with the base station in a normal or active mode and then transmits a SLP-REQ (sleep-request) message to the base station to enter into a sleep mode when there exist no more traffic to be transmitted and/or received to and/or from the base station (S601).

The base station receives the SLP-REQ message from the terminal and then transmits a SLP-RSP (sleep-response) message to the SLP-REQ message to the terminal (S603).

The SLP-RSP message may include a sleep mode operation parameter (sleep parameter) such as a sleep cycle, a listening window, and the like, for a sleep mode operation of the terminal.

According to circumstances, the base station directly transmits an unsolicited SLP-RSP message to the terminal even without a sleep mode entry request message (S601) of the terminal to instruct the terminal to enter into a sleep mode.

The terminal that has received the SLP-RSP message changes the state to a sleep mode by referring to the sleep mode operation parameter to perform a sleep mode operation.

In the sleep mode, the base station transmits a TRF-IND (traffic-indication) message to the terminal to indicate whether there exists traffic to be transferred to the terminal during a listening window (LW) (S605).

The TRF-IND message indicating whether there exists traffic is set to positive indication if there exists traffic, and set to negative indication if there exists no traffic.

If a TRF-IND message including negative indication during a listening window (LW2) in the second SLP-RSP (SC2) is received from the base station (S605), then the terminal determines that there exists no data traffic to be transmitted to a downlink, thereby increasing a current sleep cycle twice.

After the sleep cycle (SC2) that has been increased twice is completed, the terminal receives a service flow configuration request message (DSx-REQ) requesting the addition of a new service, change or deletion during a listening window (LW3) of the following sleep cycle (SC3) from the base station (S607).

The service flow configuration request message (DSx-REQ) is illustrated in the following Table 4.

TABLE 4

| Name | Value | Usage |
| --- | --- | --- |
| ~ | | |
| Operation | 0b00: To switch Sleep Cycle setting in DSx-REQ message which has been negotiated since the MS entered Sleep Mode 0b01-0b11: reserved | This indicates operation request type of DSx-REQ message |
| SCID | 0~15 | Sleep Cycle ID |

The DSx-REQ message in Table 4 includes only SCID information to be updated and switched but not includes information for the timing of starting a sleep mode operation to be updated.

At this time, the terminal applies a new sleep mode operation from the timing (610) of starting a LW that has received the DSx-REQ message. Thus, the third sleep cycle (SC3) is reset to an initial sleep mode (SC1).

In this manner, even if information for a start frame number is not included in the sleep mode update instruction, the terminal sets the sleep cycle to an initial sleep cycle, thereby easily performing a sleep mode update operation.

Similarly, even though SCID is updated through a DSx-RSP message, if the DSx-RSP message includes only SCID information to be updated and switched but not includes information for the timing of starting a sleep mode operation to be updated as illustrated in Table 5, the terminal is reset to an initial sleep mode (SC1) from the timing of starting a LW that has transmitted the DSx-RSP message, and thus the terminal sets the sleep cycle to an initial sleep cycle even though a start frame number is not included in the DSx-RSP, thereby easily performing a sleep mode.

TABLE 5

| Name | Value | Usage |
| --- | --- | --- |
| ~ | | |
| Response Code | 0b00: DSx-RSP message is transmitted to approve the switch of a Sleep Cycle setting which has been negotiated since the MS entered Sleep Mode 0b01: DSx-RSP message is transmitted to reject the request sent by MS 0b10~0b11: Reserved | This indicates response type of DSx-RSP message. |
| SCID | 0~15 | Sleep Cycle ID This field appears when Response Code is 0b00 or 0b01. |
| ~ | | |

Also, even though a sleep mode operation is updated through the sleep control extended header, if a start frame number is not included in the sleep control extended header, then the terminal resets the sleep cycle to an initial sleep cycle at the moment when receiving a sleep control extended header including SCID to be switched, thereby performing the update of a sleep mode operation.

TABLE 6

| Syntax | Size (bit) | Notes |
| --- | --- | --- |
| Last | 1 | Last Extended Header indication: 0 = one or more extended header follows the current extended header unless specified otherwise; 1 = this extended header is the last extended header unless specified otherwise |
| Type | TBD | Type of Extended header |
| Operation | 2 | 0b00: Exit Sleep Mode 0b01: Change Sleep Mode 0b10: Extension of Listening Widow 0b11: Termination of Listening Window |
| if(Operation == 0b10){ Extendable Listening Window } | 4 | Measured in Frames |
| if(Operation == 0b01){ Sleep_Cycle_ID (SCID) } | 4 | |
| Reserved | variable | Reserved bits are added at the end of DL Sleep Control Extended Header for byte alignment |

Hereinafter, a sleep mode update operation will be described in case where the base station transmits a sleep mode message including SCID and a start frame number to apply a new sleep mode parameter to the terminal during a listening window of the terminal, and a case where the terminal receives a message for changing the sleep mode parameter subsequent to the start frame number.

Figure 7:
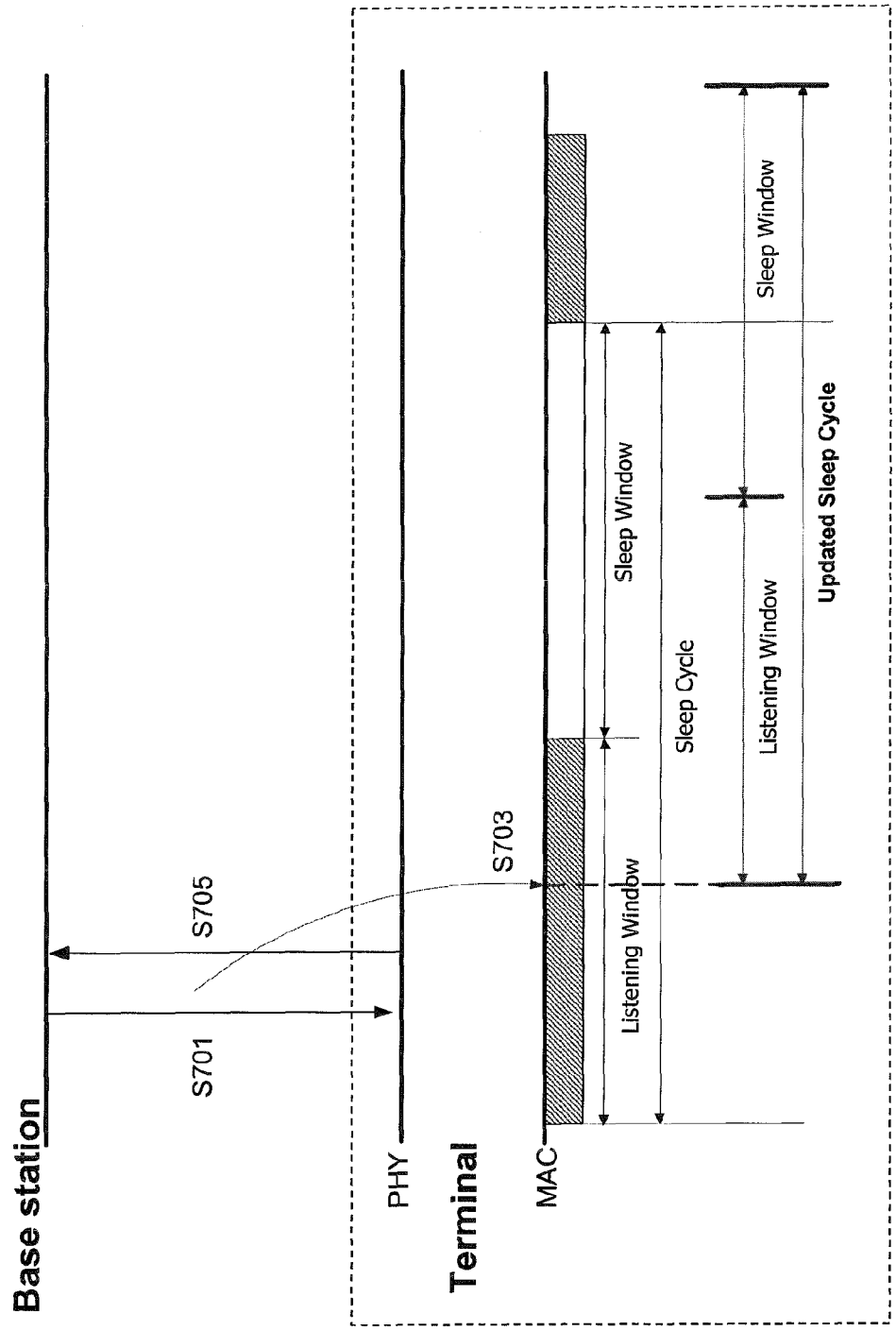
FIG. 7 is a view illustrating that a base station updates SCID to change a sleep cycle during a listening window.

FIG. 7 is a view illustrating that a base station updates SCID to change a sleep cycle during a listening window;

As illustrated in FIG. 7, in case where a sleep mode operation of the terminal is required to be updated, for example, in case where the service characteristic of a service flow or the like is changed, the base station transmits an unsolicited SLP-RSP or DL sleep control extended header during a listening window of the terminal (S701). Otherwise, even in case of receiving a report about a change for the foregoing service characteristic from the terminal, the base station may transmit the foregoing unsolicited SLP-RSP or downlink (DL) sleep control extended header to the terminal in response to the report to update a sleep mode operation.

The terminal receives the unsolicited SLP-RSP or downlink (DL) sleep control extended header during the listening window, and refers to start frame information to which a new SCID value and a sleep mode update operation are applied, thereby applying a new sleep cycle at the start frame point (S703). The start frame information may be known through a start frame number or start frame offset parameter, and the start frame number or start frame offset is bit information indicating a start frame in which a sleep mode operation is newly started and they correspond to substantially same information.

If the start frame information (start frame number or start frame offset) is not included in the received unsolicited SLP-RSP or downlink (DL) sleep control extended header, then the terminal resets the sleep cycle to an initial sleep cycle at the moment when receiving the unsolicited SLP-RSP or downlink (DL) sleep control extended header including SCID to be switched, thereby performing the update of a sleep mode operation.

Subsequently, the terminal transfers a confirmation (ACK) message to the unsolicited SLP-RSP or downlink (DL) sleep control extended header reception to the base station (S705).

Figure 8:
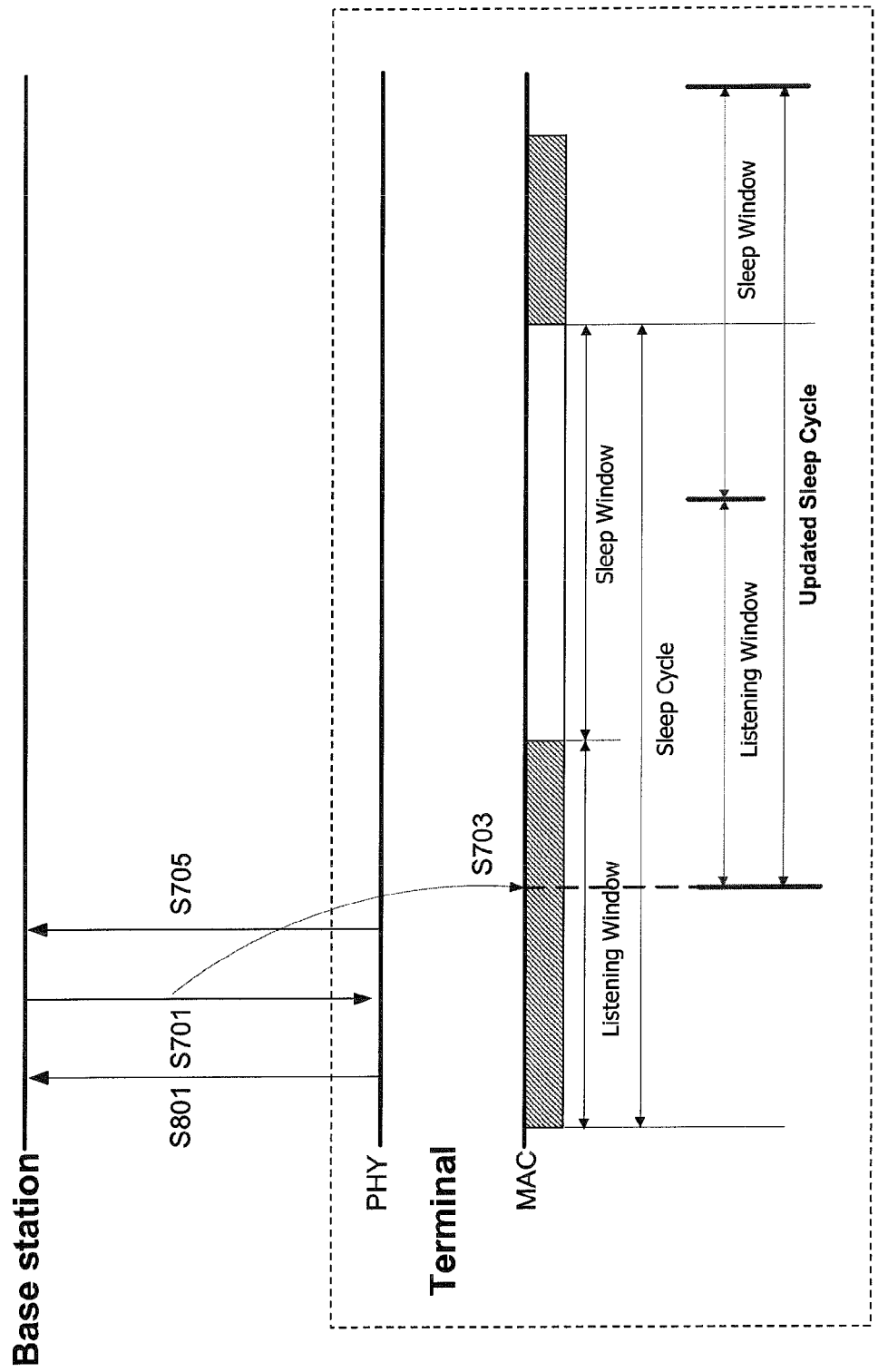
FIG. 8 is a view illustrating that a base station updates SCID to change a sleep cycle during a listening window by a report of the terminal.

FIG. 8 is a view illustrating an embodiment in which the terminal reports a change for the service characteristic to the base station if there is a change of the foregoing service characteristic or the like in the start frame being executed in the terminal (S801), and the base station transmits the foregoing unsolicited SLP-RSP or downlink (DL) sleep control extended header to the terminal to update a sleep mode operation in response to that.

Figure 9:
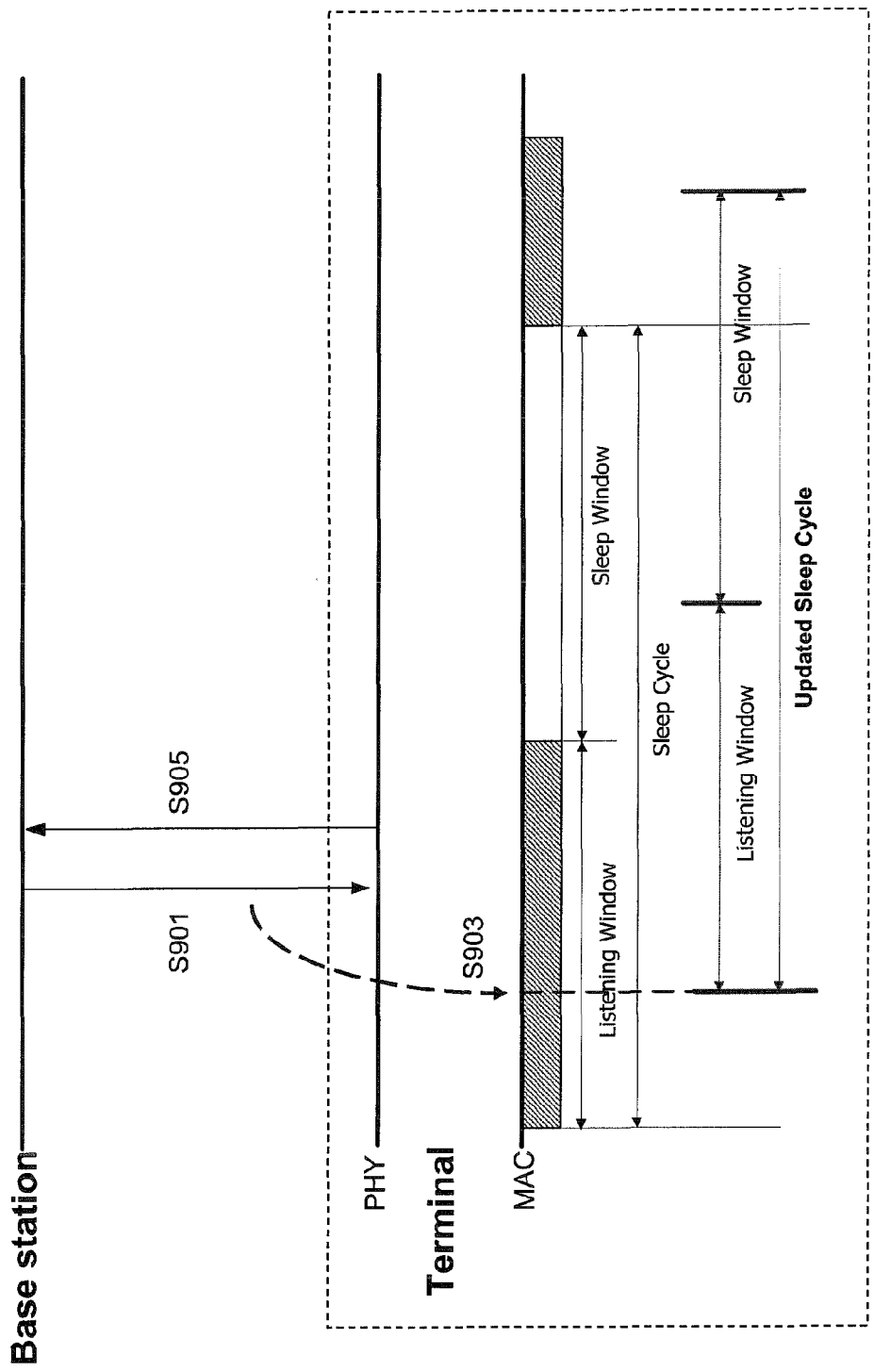
FIG. 9 is a view illustrating a sleep mode update operation in case where a terminal receives sleep mode update information subsequent to a start frame timing according to an embodiment of the present invention.

FIG. 9 is an embodiment in case where the base station has transmitted an unsolicited AAI_SLP-RSP or downlink (DL) sleep control extended header to the terminal to change the sleep cycle during a listening window (S901) but the terminal receives the unsolicited SLP-RSP or downlink (DL) sleep control extended header subsequent to the timing of the start frame (start frame number or start frame offset) to which a new sleep cycle parameter is to be applied.

In other words, even if the unsolicited SLP-RSP or downlink (DL) sleep control extended header is received subsequent to the start frame number, the terminal applies a new sleep cycle from the start frame number point to operate a sleep mode (S903).

Figure 10:
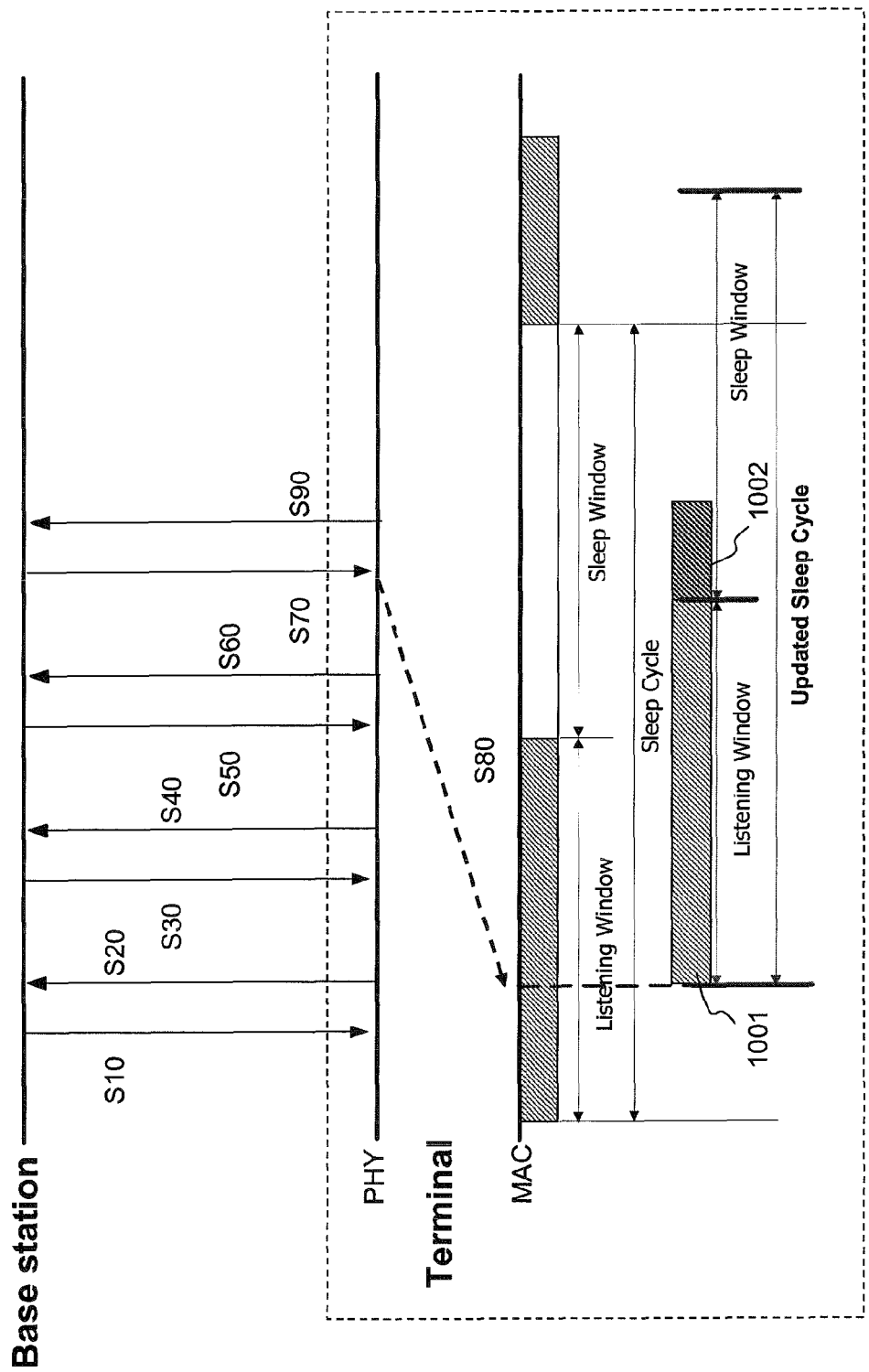
FIG. 10 is a view illustrating a sleep mode update operation in case where a terminal receives sleep mode update information subsequent to a start frame timing according to another embodiment of the present invention.

FIG. 10 is another embodiment in case where the base station has transmitted an unsolicited SLP-RSP or downlink (DL) sleep control extended header to the terminal to change the sleep cycle during a listening window but the terminal receives the unsolicited SLP-RSP or downlink (DL) sleep control extended header subsequent to the timing of the start frame number to which a new sleep mode parameter is to be applied. If it is required to update a sleep mode operation, then the base station transfers an unsolicited SLP-RSP or downlink (DL) sleep control extended header during a listening window of the terminal (S10).

In case where a reception data error has occurred due to the channel situation, the terminal transmits a NACK message in response to the error (S20) to request data retransmission, and then performs a data retransmission process such as hybrid automatic retransmission request (HARQ) and the like (S30, S40, S50, S60), as illustrated in the drawing, and receives the unsolicited SLP-RSP or downlink (DL) sleep control extended header normally at the fourth transmission timing (S70).

At this time, the terminal has received the unsolicited SLP-RSP or downlink (DL) sleep control extended header subsequent to the start frame number.

In this case, as illustrated in drawing, it is processed such that the listening window is extended (1001) to get out of the default listening window (1002), and also even if the unsolicited SLP-RSP or downlink (DL) sleep control extended header transmitted by the base station is received subsequent to the start frame number, the terminal applies a new sleep cycle from the start frame of the unsolicited SLP-RSP or downlink (DL) sleep control extended header to operate an updated sleep mode (S80).

Subsequently, the terminal transmits a sleep mode update confirmation message to the base station (S90).

The type of a downlink (DL) sleep control extended header transmitted to the terminal by the base station to apply a new sleep mode parameter to a listening window according to an embodiment of the present invention is illustrated in the following Table 7.

TABLE 7

| Syntax | Size (bit) | Notes |
|---|---|---|
| Last | 1 | Last Extended Header indication: 0 = one or more extended header follows the current extended header unless specified otherwise; 1 = this extended header is the last extended header unless specified otherwise |
| Type | TBD | Type of Extended header |
| Operation | 2 | 0b00: Exit Sleep Mode 0b01: Change Sleep Mode 0b10: Extension of Listening Widow 0b11: Termination of Listening Window |
| if(Operation == 0b10){ Extendable Listening Window } | 4 | Measured in Frames |
| if(Operation == 0b01){ Sleep_Cycle_ID (SCID) | 4 | — |
| Start Frame Number } | 4 | This parameter indicates start frame number that the sleep cycle changes to the new sleep cycle settings. (indicate a start frame to which a new sleep cycle is applied) |
| Reserved | variable | Reserved bits are added at the end of DL Sleep Control Extended Header for byte alignment |

The type of an unsolicited SLP-RSP message transmitted to the terminal by the base station to apply a new sleep mode parameter to a listening window according to an embodiment of the present invention is illustrated in the following Table 8.

TABLE 8

| Syntax | Size (bit) | Notes |
|---|---|---|
| AAI_SLP-RSP ( ){ Request_Code | 2 | 0b00: Exit from Sleep Mode 0b01: Enter Sleep Mode 0b10: Change Sleep Mode 0b11: Reserved |
| Sleep_Cycle_ID (SCID) if(Request_Code == 0b01){ | 4 | |

TABLE 8-continued

| Syntax | Size (bit) | Notes |
|---|---|---|
| Traffic Indication Message Flag (TIMF) | 1 | If TIMF = 0, then a Traffic Indication Message is never sent<br>If TIMF = 1, then a Traffic Indication Message is sent every Listening window |
| Listening window Extension Flag (LWEF) | 1 | If LWEF = 0, the Listening window is of fixed duration.<br>If LWEF = 1, the Listening window can be extended and is of variable duration<br>In case of TIMF = 1, LWEF shall be set to 1 |
| Early Listening Window Termination Flag (ELWTF) | 1 | If ELWTF = 0, the early listening window termination is not supported.<br>If ELWTF = 1, the early listening window termination is supported. |
| Start Frame Number | 6 | Start frame number for first sleep window |
| Initial Sleep Cycle | 8 | — |
| Final Sleep Cycle | 10 | — |
| Listening Window | 6 | — |
| if(LWEF == 1){ | | |
| T_AMS | 4 | Measured in Frames |
| T_HARQ_Retx | 4 | Measured in Frames |
| } | | |
| } | | |
| else if(Request_Code == 0b10){ | — | if(Request_Code == 0b01 ‖ 0b10){ |
| Start Frame Number | | This parameter indicates start frame number that the sleep cycle changes to the new sleep cycle settings. (indicate a start frame to which a new sleep cycle is applied) |
| } | | |
| Padding | variable | Padding bits to ensure byte aligned. |
| } | | |

As described above, even if a sleep mode update message is normally received subsequent to the timing of starting an update operation through a data retransmission process, it is processed such that the sleep mode is operated from the timing prior to data reception, thereby preventing data transmission and reception from being unsynchronized between the terminal and the base station.

Figure 11:
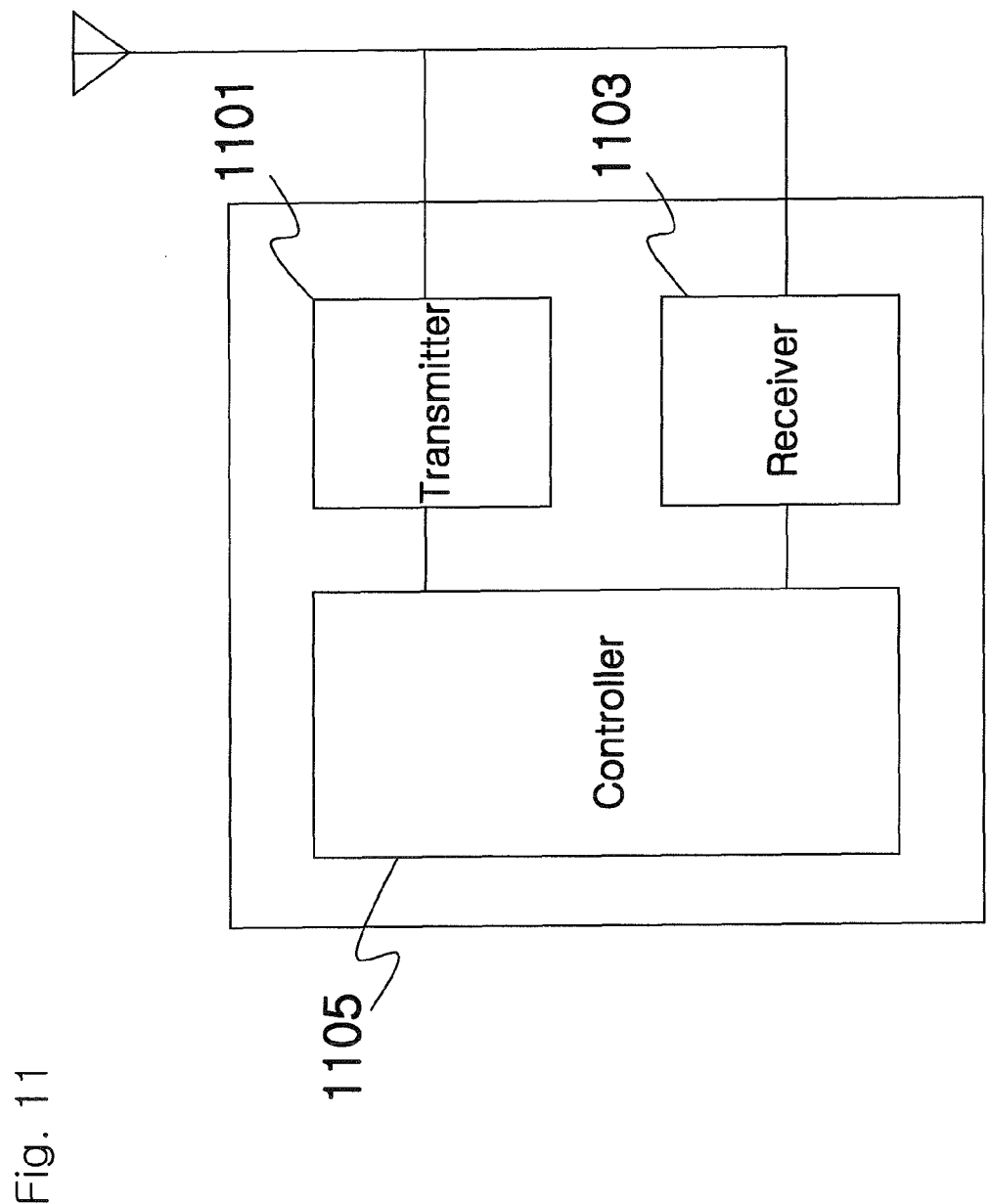
FIG. 11 is a block diagram schematically illustrating a sleep mode operation apparatus according to an embodiment of the present invention.

FIG. 11 is a block diagram schematically illustrating a sleep mode operation apparatus according to an embodiment of the present invention.

As illustrated in the drawing, a sleep mode operation apparatus may include a transmitter 1101 configured to transmit a sleep mode request message for entering into a sleep mode to the base station, a receiver 1103 configured to receive a sleep mode response message and a data traffic generation indication message including a sleep mode operation parameter from the base station, and a controller 1105 configured to change the state to a sleep mode by referring to a sleep mode operation parameter.

The receiver 1103 receives a service flow configuration request message including a service flow connection related to service addition, change or deletion and the service flow operation parameter.

The controller 1105 performs the service flow connection and operation parameter configuration, and updates a sleep cycle of the sleep mode and sleep mode operation for the service flow operation. According to an embodiment of the present invention, SCID and start frame number are transferred through a DSx-REQ/RSP or downlink (DL) sleep control extended header related to the service addition, change or deletion, and thus the controller 1105 can update the sleep cycle of a current sleep mode by referring to the sleep mode update information when configuring a service flow connection.

The method according to the present invention as described above may be implemented by software, hardware, or a combination of both. For example, the method according to the present invention may be stored in a storage medium (for example, memory, flash memory, hard disk, and the like inside the terminal), and may be implemented through codes or instructions in a software program that can be performed by a processor (for example, microprocessor inside the terminal).

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

What is claimed is:

1. A method of updating a sleep mode parameter in a terminal, the method comprising:
   receiving, from a base station, a service flow configuration request (DSx-REQ) message in sleep mode, the service flow configuration request (DSx-REQ) message comprising a service flow parameter for service flow configuration and a sleep cycle identifier (SCID) for changing or switching sleep cycle setting;
   applying the sleep cycle identifier (SCID) included in the service flow configuration request (DSx-REQ) message, and
   updating the sleep cycle identifier (SCID) to the sleep cycle identifier (SCID) included in the service flow configuration request (DSx-REQ) message,
   wherein the service flow configuration request (DSx-REQ) message further comprises a start frame number field indicating a frame to which the sleep cycle identifier (SCID) included in the service flow configuration request (DSx-REQ) message is applied, and
   wherein the updated sleep cycle identifier (SCID) is applied based on the start frame number field.

2. The method of claim 1, wherein the service flow configuration request (DSx-REQ) message is a dynamic service add request (DSA-REQ) message, a dynamic service change request (DSC-REQ) message or a dynamic service delete request (DSD-REQ) message.

3. The method of claim 1, further comprising
   transmitting a response for the service flow configuration request (DSx-REQ) message to the base station; and
   configuring a service flow according to the service flow parameter.

4. A method of updating a sleep mode parameter in a terminal, the method comprising:
   transmitting, to a base station, a service flow configuration request (DSx-REQ) message for changing or switching a sleep cycle setting in sleep mode;
   receiving, from the base station, a service flow configuration response (DSx-RSP) message in response to the service flow configuration request (DSx-REQ) message in sleep mode, the service flow configuration response (DSx-RSP) message comprising a sleep cycle identifier (SCID); and applying the sleep cycle identifier (SCID) included in the service flow configuration response (DSx-RSP) message, and updating the sleep cycle identifier (SCID) to the sleep cycle identifier (SCID) included in the service flow configuration request (DSx-REQ) message, wherein the service flow configuration response (DSx-RSP) message further comprises a start frame number field indicating a frame to which the sleep cycle identifier (SCID) included in the service flow configuration response (DSx-RSP) message is applied and wherein the step of applying the sleep cycle identifier (SCID) is based on the start frame number field.

5. The method of claim 4, wherein the service flow configuration request (DSx-REQ) message is a dynamic service add request (DSA-REQ) message, a dynamic service change request (DSC-REQ) message or a dynamic service delete request (DSD-REQ) message.

6. The method of claim 4, wherein the service flow configuration request (DSx-REQ) message further comprises a sleep cycle identifier (SCID).

7. A method of updating a sleep mode parameter in a terminal, the method comprising:

transmitting a sleep mode request message for entering into sleep mode to a base station;

receiving a sleep mode response message comprising a sleep mode operation parameter from the base station;

entering into sleep mode based on the sleep mode operation parameter;

receiving, from the base station, sleep mode update information for changing or switching a sleep cycle setting, the sleep mode update information comprising a sleep cycle identifier (SCID) and start frame number field for applying the sleep cycle identifier (SCID); and applying the sleep cycle identifier (SCID) based on the sleep mode update information, wherein the sleep cycle identifier (SCID) is applied at a frame specified by the start frame number field, and wherein the sleep mode update information is received via a service flow configuration request (DSx-REQ) message or a service flow configuration response (DSx-RSP) message.

8. An apparatus for updating a sleep mode parameter, the apparatus comprising:

a receiver configured to receive a service flow configuration request (DSx-REQ) message in sleep mode, the service flow configuration request (DSx-REQ) message comprising a sleep cycle identifier (SCID) for changing or switching sleep cycle setting;

a transmitter configured to transmit a response for the service flow configuration request (DSx-REQ) message; and a controller configured to apply the sleep cycle identifier (SCID) included in the service flow configuration request (DSx-REQ) message, wherein the service flow configuration request (DSx-REQ) message further comprises a start frame number field indicating a frame to which the sleep cycle identifier (SCID) included in the service flow configuration request (DSx-REQ) message is applied, and wherein the controller controls to update the sleep cycle identifier (SCID) to the sleep cycle identifier (SCID) included in the service flow configuration request (DSx-REQ) message and to apply the updated sleep cycle identifier (SCID) based on the start frame number field.

* * * * *